United States Patent
Reisser et al.

(10) Patent No.: US 9,687,948 B2
(45) Date of Patent: Jun. 27, 2017

(54) BAR FEEDER

(71) Applicant: LNS Management SA, Orvin (CH)

(72) Inventors: Frank Antonin Reisser, Biel/Bienne (CH); Etienne Todoerti, Malleray (CH)

(73) Assignee: LNS Management SA, Orvin (CH)

(*) Notice: Subject to any disclaimer, the term of this patent is extended or adjusted under 35 U.S.C. 154(b) by 0 days.

(21) Appl. No.: 15/038,940

(22) PCT Filed: Nov. 25, 2013

(86) PCT No.: PCT/EP2013/074590
§ 371 (c)(1),
(2) Date: May 24, 2016

(87) PCT Pub. No.: WO2015/074722
PCT Pub. Date: May 28, 2015

(65) Prior Publication Data
US 2016/0346886 A1   Dec. 1, 2016

(51) Int. Cl.
*B65G 47/26*   (2006.01)
*B23Q 7/00*   (2006.01)

(52) U.S. Cl.
CPC ............. *B23Q 7/001* (2013.01); *B23Q 7/002* (2013.01); *B65G 47/26* (2013.01)

(58) Field of Classification Search
CPC ...... B65G 1/0442; B65G 33/00; B65G 33/26; B65G 33/265; B65G 47/02; B65G 47/12; B65G 65/46; B21F 23/007
USPC .................. 198/443, 459.3, 545, 548, 550.6, 198/657–677; 414/22.51–22.71, 310, 414/319, 320, 745.1–746.8
See application file for complete search history.

(56) References Cited

U.S. PATENT DOCUMENTS 1,670,165 A * 5/1928 Popper .................... A01J 21/02
                                                                198/661
2,551,645 A   5/1951 Stadelman
(Continued)

FOREIGN PATENT DOCUMENTS

| DE | 3420254 | * 12/1985 | ............. B65G 33/06 |
| EP | 1213091 | 6/2002 | |
| JP | 60238254 | 11/1985 | |

OTHER PUBLICATIONS

European Patent Office, International Search Report and Written Opinion of the International Searching Authority, Apr. 22, 2014.

*Primary Examiner* — James R Bidwell
(74) *Attorney, Agent, or Firm* — Wood Herron & Evans LLP

(57) ABSTRACT

A bar feeder for separately feeding longitudinal bars (3, 3') from a storage unit (1) to a transportation unit (2) is provided. The storage unit (1) comprises a delivery mechanism, which delivers bars (3) in delivery direction to the transport unit (2). The transport unit (2) comprises separated, moveable spaces (8) for accommodating the bars (3'), wherein the spaces are moveable in a transport direction. An abutment screw section is provided on the transport unit, which is moveable from a blocking position for blocking a bar (3) in delivery direction and a release position for allowing movement of the bar in delivery direction and into a space. The abutment screw section is switched between the blocking position and the release position by a rotational movement of the transport unit (2).

15 Claims, 3 Drawing Sheets

(56) References Cited

U.S. PATENT DOCUMENTS

| | | | | |
|---|---|---|---|---|
| 3,670,902 | A * | 6/1972 | Kaplan | B21B 39/002 198/774.3 |
| 3,986,618 | A * | 10/1976 | Woolslayer | E21B 19/15 221/224 |
| 4,604,018 | A * | 8/1986 | Kruse | A01D 90/08 198/374 |
| 5,813,103 | A | 9/1998 | Girouard, Sr. et al. | |
| 6,543,606 | B2 * | 4/2003 | Lindenblatt | B65G 33/02 198/443 |
| 8,474,549 | B2 * | 7/2013 | Piipponen | E21D 20/003 175/52 |
| 8,684,164 | B2 * | 4/2014 | Poloni | B21C 49/00 198/418.6 |
| 2002/0028642 | A1 | 3/2002 | Walczak et al. | |
| 2002/0100664 | A1 * | 8/2002 | Lindenblatt | B65G 33/02 198/663 |

* cited by examiner

US 9,687,948 B2

BAR FEEDER

This application claims priority, under Section 371 and/or as a continuation under Section 120, to PCT Application No. PCT/EP2013/074590, filed on Nov. 25, 2013.

TECHNICAL FIELD OF THE INVENTION

The present invention relates to a bar feeder for longitudinal bars, which are fed from a storage for example to a further processing device like a turning or milling machine or to a transportation or pusher apparatus.

BACKGROUND ART

For the production of many kinds of machine components longitudinal bars are used as starting element, for example in the form of metallic bars or wooden poles. The longitudinal bars are prefabricated at a first production site, stored in a suitable storage and transported to a specific machine for further processing. In the storage many bars are stocked parallel to each other, lying next to each other and on top of each other. For further processing the bars have to be isolated, separately removed from the storage and transported to a processing machine. Different kinds of separating and transportation devices are known, which handle longitudinal bars within a manufacturing process. For transportation for example conveyor lines or rotating spindles are used. For separation the bars may manually or automatically entered into a sorting unit, which is designed to feed only one single bar to the transportation unit. Such separating and transportation devices have to make sure that definitely just one bar proceeds to a processing machine independent of weight, diameter, length, and shape of the bar. In particular for thin bars there is a risk of feeding more than one bar or feed a bar in a false alignment to a processing machine.

In EP 1 110 642 A2 a device for feeding longitudinal bars in the manufacture of melded laths is shown, wherein the bars are first transported by a vertical lift to a gripping unit, which grips the bars separately and dispenses each bar to a conveyor plane. The gripping unit comprises a transport belt along which a plurality of gripping organs are arranged in series. The gripping organs comprise a concave groove for accommodating a single bar and an articulated latch, which closes the groove after the bar has been dropped into the groove. The gripping organ is moved around an axle of the conveyor plane and the latch is opened so that the bar falls from the groove onto a moveable transport plane. The feeding device needs an elaborated mechanism to control the different components and movements to ensure that the bars are handled correctly.

Another bar feeder is disclosed in US 2006/0153666, which comprises a swing member designed to be swingably moved around a rotation shaft located above a guide rail for transportation of the bars. The bars are stored on an oblique chute and guided by several guide elements, which limit the movement of the bars. By gravity the bars roll towards an output pusher, which pushes a single bar from the chute. The bar falls towards the swing member, which is moveable from a blocking position for holding back the bar to a release position for transferring the bar to the guide rail. Again, this is a complicated mechanism, wherein many mechanical parts have to interact so that the bar feeder works properly. Furthermore, the bar feeder is only suitable for bars with a specific diameter because the bars have to fit through gaps defined by the mechanical parts, e. g. the guide elements or the swing member, and also may not be to small so that more than one bar could fit through these gaps.

SUMMARY OF THE INVENTION

It is an object of the present invention to provide a bar feeder for separating and transporting individual bars from a stock of bars, which comprises a simply design, guaranties proper separation and feeding of bars, is suitable for different kind of bars and works reliably, in particular for the transportation of bars in a high pace.

These and other objects are fulfilled by a bar feeder according to independent claim 1. Advantageous features and preferred embodiments of the bar feeder according to the invention are disclosed in dependent claims.

According to the present invention a bar feeder for separately feeding longitudinal bars to a transportation unit of the bar feeder, e. g. for transporting and feeding the bars to a processing machine, comprises a storage unit with a delivery mechanism which delivers bars in delivery direction to the transport unit. The storage unit is designed to stock a plurality of bars in longitudinal direction next to each other. The bars are passed on to the transport unit from a release edge of the delivery mechanism. For example, the delivery unit comprises a delivery chute and the delivery mechanism moves the bars to the release edge, which may terminate the delivery chute, so that the bars are moved towards the transport unit and drop from the release edge to the transport unit. Preferably the delivery mechanism, in particular the release edge, is arranged vertically above the transport unit.

The transport unit comprises separated spaces for accommodating bars. Preferably one space is designated to one bar, but basically more than one bar could be fed to one space in case this would be desirable. The spaces move in transport direction along the transport unit and act as drivers for the bars to move the bars in transport direction. Furthermore, an abutment means is provided, which is provided for allowing movement of the bar in delivery direction and into a space situated in front of the abutment means, the bar being then moved in delivery direction by a rotational movement of the transport. In particular, according to the invention, the spaces move along the transportation unit by the rotational movement of the transport unit such that they can convey the bars in delivery direction one by one. Advantageously, the abutment means is arranged on the transport unit. Thus the abutment means is fixedly coupled to the spaces accommodating the bars. Therefore no provisions for synchronization of the release movement of a bar from the storage unit and the transportation movement of the spaces on the transport unit are required.

In a preferred embodiment of the bar feeder according to the present invention the transport unit comprises at least two rotatably mounted rods. The rods are for example cylindrically shaped. Each rod is orientated in transport direction and angled to the delivery unit. Advantageously the rods are oriented generally perpendicular to the delivery chute, so that the delivery direction is not angled to the transport direction. Each rod comprises a helical outer structure wound around the length of the rod. The helical outer structure provides the separated spaces along the length of the rod, because parts of the structure are repeated on one circumferential side of the rod.

Preferably the helical outer structure is realized as a screw-like wall structure twisted around the circumference of the rod. The screw-like wall structure extends radially from the rods. In between adjacent wall parts on one side of the circumference a space for accommodating a bar is established. Alternatively, the helical outer structure may be a groove running helically along the rod. Sections of the groove along one side of the rod serve as spaces for the bars.

There are at least two rods, which run parallel to each other and are distanced from each other to provide at least two supporting points for a bar, that has to be transported. The supporting points correspond to the spaces for the bars. By rotating the rods the spaces and supporting points respectively, defined by sections of the helical outer structure, are moved along the length of the rod. Thus the bars are transported by the transport unit in transport direction away from the storage unit.

Preferably the abutment means is realized by an abutment screw section on the transport unit, wherein the abutment screw section extends basically radially from the transport unit. For example, an abutment screw section extends from each of the rods of the transport unit as mentioned before. The abutment screw section can extend radially past a release edge of the delivery mechanism. That means that the abutment screw section can extend vertically upwards and pass the release edge, so that a bar reaching the release edge abuts against the abutment screw section when falling down from the release edge thanks to a gap created between the release edge and the abutment screw section.

The abutment screw section preferably is a helical section of the screw-like wall structure as described before. The abutment screw section may be given by a wall section, which extends radially further from the rod as the rest of the wall structure. Alternatively the abutment screw section can be a helically section extending from a helical groove like mentioned before.

Advantageously the rod, the helical outer structure and the abutment screw section of the transport unit are one integrally formed piece. This simplifies manufacturing and installation of the transport unit of the bar feeder according to the invention. There is no relative movement between the rod, the helical outer structure and the abutment screw section and therefore no synchronization of these parts is necessary. A control unit may be provided, which controls the rotation of the at least two rods such that their abutment means are in equal rotational position relative to the delivery unit and therefore to a release edge of the delivery mechanism. That means the abutment screw sections are positioned simultaneously in a blocking position or in a release position.

In one embodiment the delivery direction of the delivery mechanism basically corresponds to the transport direction of the transport unit. Thus bars can be filled on one side of the bar feeder to an introduction end of the storage unit, are transported by the delivery mechanism through the storage unit to a release end of the storage unit, are fed to the transport unit and further transported away from the release end of the storage unit all in the same direction. Alternatively, the delivery direction may be opposite to the transport direction. For example, the storage unit may be arranged above the transport unit, so that the bars can be delivered within the storage unit in one direction and after they are fed to the spaces of the transport unit they are transported in the reverse direction.

Moreover, it is advantageous that the abutment means extends in radial direction past a release edge of the delivery mechanism for more than 180°, preferably for about 360°, around the rod. The abutment means comprises a separating edge at least partially extending radially from the transport unit. The separating edge cuts in between a first bar and a second bar moved in delivery direction towards the release edge, when the abutment means is rotated by the transport unit. This is because the separating edge is turned around the transport unit at the same time the gap occurs between the abutment means and the release edge, which allows the first bar slowly to drop into the continuously opening gap. Thus the first bar moves behind the separating edge in longitudinal direction of the transport unit and when the separating edge is turned further to pass the release edge again, it may cut in between the first and the second bar and act as a stopper and/or separator for the second bar. Before that, the gap was opened that much, that the first bar falls into a space onto the transport unit and due to rotation of the helical outer structure creating the spaces the first bar is moved away from the storage unit.

The releasing of the bars from the releasing edge can be controlled by an operator either manually or by means of a dedicated control unit, but it could also be managed by an automated process. In any case, it is important that the next bar is only released after the previous bar, by the rotation of the transport unit, has passed behind the abutment means. In this way all bars on the storage unit can separately be fed to individual spaces in the transport unit and separately be fed to a further processing machine.

BRIEF DESCRIPTION OF THE DRAWINGS

One exemplary embodiment of the invention will be illustrated in the following drawings, which merely serves for explanation and should not be construed as being restrictive. The features of the invention becoming obvious from the drawings should be considered to be part of the disclosure of the invention both on their own and in any combination. The drawings show.

DETAILED DESCRIPTION OF THE PREFERRED EMBODIMENT

Figure 1:
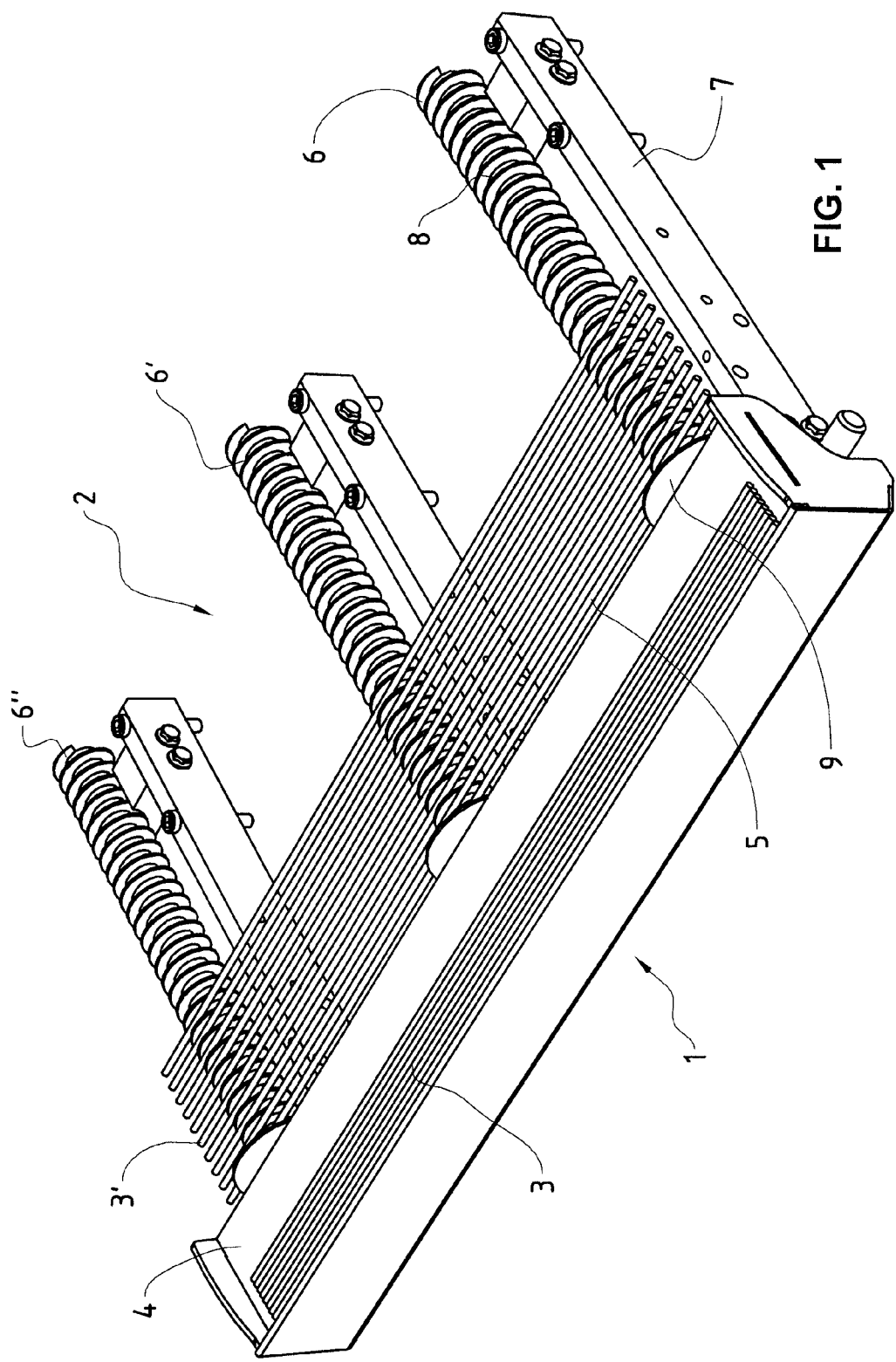
FIG. 1: a 3-dimensional schematic view of an embodiment of a bar feeder according to the invention.

FIG. 1 shows an exemplary embodiment of a bar feeder for separately feeding longitudinal bars 3 from a storage unit 1 to a transportation unit 2 of the bar feeder. The storage unit 1 comprises a delivery mechanism which delivers bars 3 in delivery direction to the transport unit 2. These bars 3 are stocked in the storage unit for example in a tray on a delivery chute 4. They may in particular lie next to and above each other. As shown in FIG. 1, the bars 3 lie next to each other on the chute 4 at a first end of the storage unit 1. The delivery mechanism may be provided as a mechanism for slightly tilting the chute 4 towards the transport unit 2, so that the bars 3 roll in direction of the transport unit 2 due to gravitiy. Alternatively or additionally, the storage unit 1 may comprise pushers for pushing the bars 3 in direction of the transport unit 2. Also the bars may be moved towards the transport unit 2 manually. In any case, the bars 3 are delivered to a release edge 5 of the delivery mechanism.

The transport unit is realized by three rotatable mounted longitudinal rods 6, 6', 6". Of course, it would also be possible to provide for a transport unit comprising more or less than tree rods 6', 6", 6'". In any event, rods 6, 6', 6" may be mounted in a common frame or individually, each in a support 7 as shown in FIG. 1. The frame or the supports are stationary for example on the ground of a production site.

The rods 6, 6', 6" extend basically perpendicular from the storage unit 1, in particular from the release edge 5, in direction of the delivery direction. The rods 6, 6', 6" are distanced from each other to act on the bars 3' at several points along their length (the bars on the transport unit 2 are referenced to as bars 3' in order to distinguish them from the bars 3 in the storage unit). Each rod comprises a plurality of separated, moveable spaces 8 for accommodation and support of a bar. Thus, as shown in FIG. 1, the rods 6, 6', 6" provide three supporting points for each bar. As can be seen in FIG. 1, several bars 3' are distributed on the transport unit 2, wherein each of the bars 3' is individually located in a space 8 on the rods 6, 6', 6". Furthermore, each of the rods 6, 6', 6" comprises an abutment means 9, which is arranged opposite to the release edge 5 of the storage unit 1. The rods 6, 6', 6" are designed identical, therefore just rod 6 is explained in more detail in the following.

Figure 2:
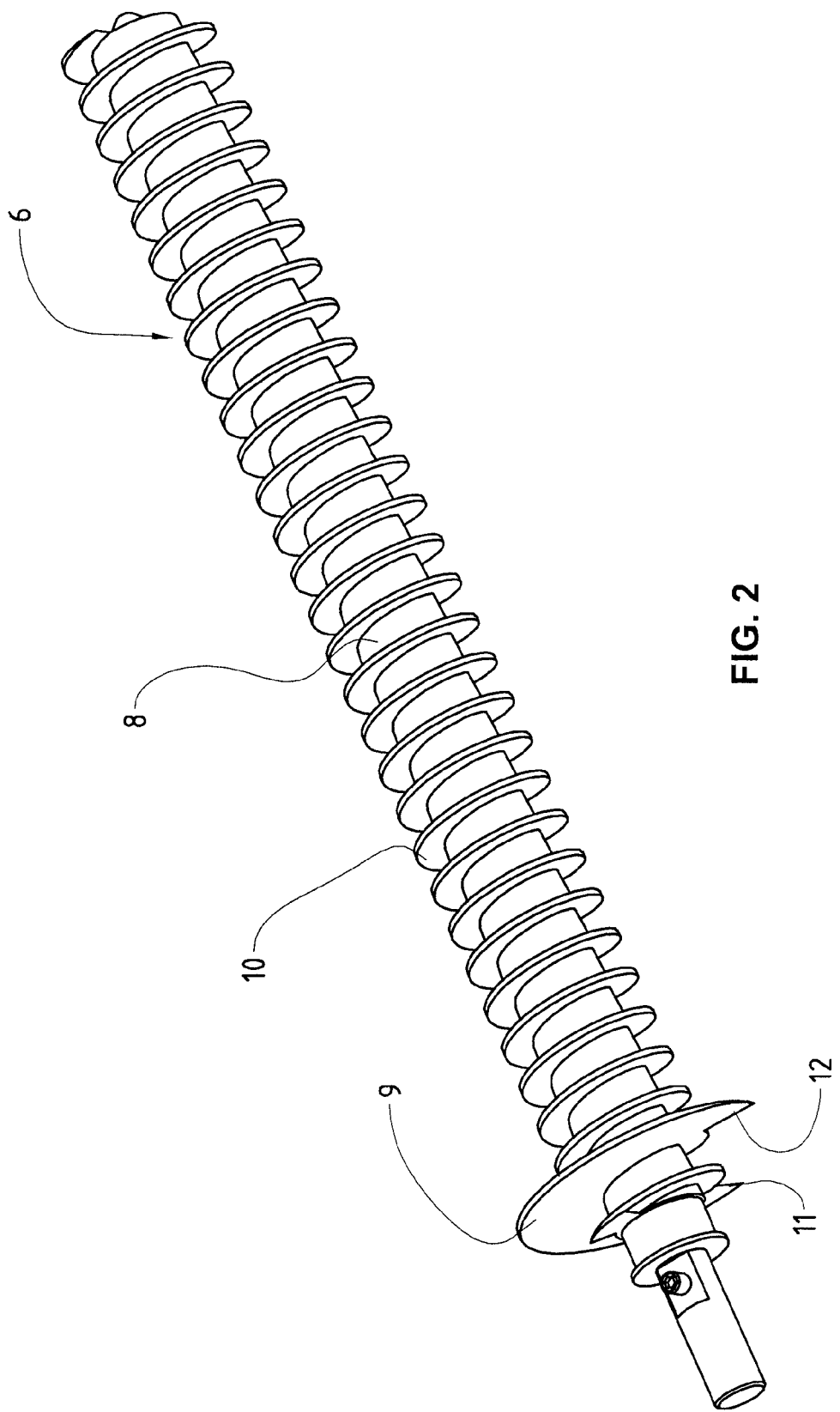
FIG. 2: a 3-dimensional schematic view of a transport unit of the bar feeder according to FIG. 1, FIG. 3: a longitudinal side view of the bar feeder according to FIG. 1.

FIG. 2 shows the rod 6 in more detail. Rod 6 is of elongated cylindrical shape. On its circumference the rod 6 comprises a helical outer structure in form of a screw-like wall 10, which is wound many times around the rod 6, basically along the full length of the rod 6. Along one side of the circumference of the rod, for example the upper side as seen in FIG. 2, the spaces 8 are realized in between two successive wall sections of the helical outer structure and the outer rod surface. The radial extension of the screw-like wall 10 is chosen such that the successive walls may restrict a bar 3' in between them. Generally, there are as many spaces 8 as the screw-like wall is turned around the rod 6. The spaces 8 correspond to the supporting points for the bars 3'. Because of the screw-like structure, the spaces 8 wander along the length of the rod 6, when rod 6 is rotated. It has to be understood that in the meaning of the present invention the spaces 8 are not defined as fixed compartments of the rod, but as an areas of the rod, which are defined by their orientation towards the bars 3'. The rod 6 may comprise a driving shaft 14, which is coupled to a drive unit.

On one end (left side in FIG. 2) the rod 6 comprises an abutment means in form of an abutment screw section 9. The abutment screw section 9 is a helical section of the screw-like wall 10, wherein the radial extension of this helical section is larger than the radial extension in the area of the other spaces 8 as mentioned above. The abutment screw section 9 preferably extends around the rod 6 about 360°. The abutment screw section 9 comprises a first edge 11 and a second edge 12 running perpendicular to the longitudinal direction of the rod 6, wherein in longitudinal direction of rod 6 the first edge 11 is located closer to the storage unit 1 and the release edge 5, respectively, than the second edge 12, because of the helical structure of the of the abutment screw section 9. The first edge 11 may serve as a separating edge as will be explained below. Alternatively to the radially aligned edges as shown in FIG. 2, the abutment screw section 9 may be defined by a wall section of essentially continuously increasing and decreasing radial extension. When the rod 6 is rotated about its longitudinal axis, the edges 11 and 12 are turned around the rod as well. Also the spaces 8 wander along the length of the rod 6.

Figure 3:
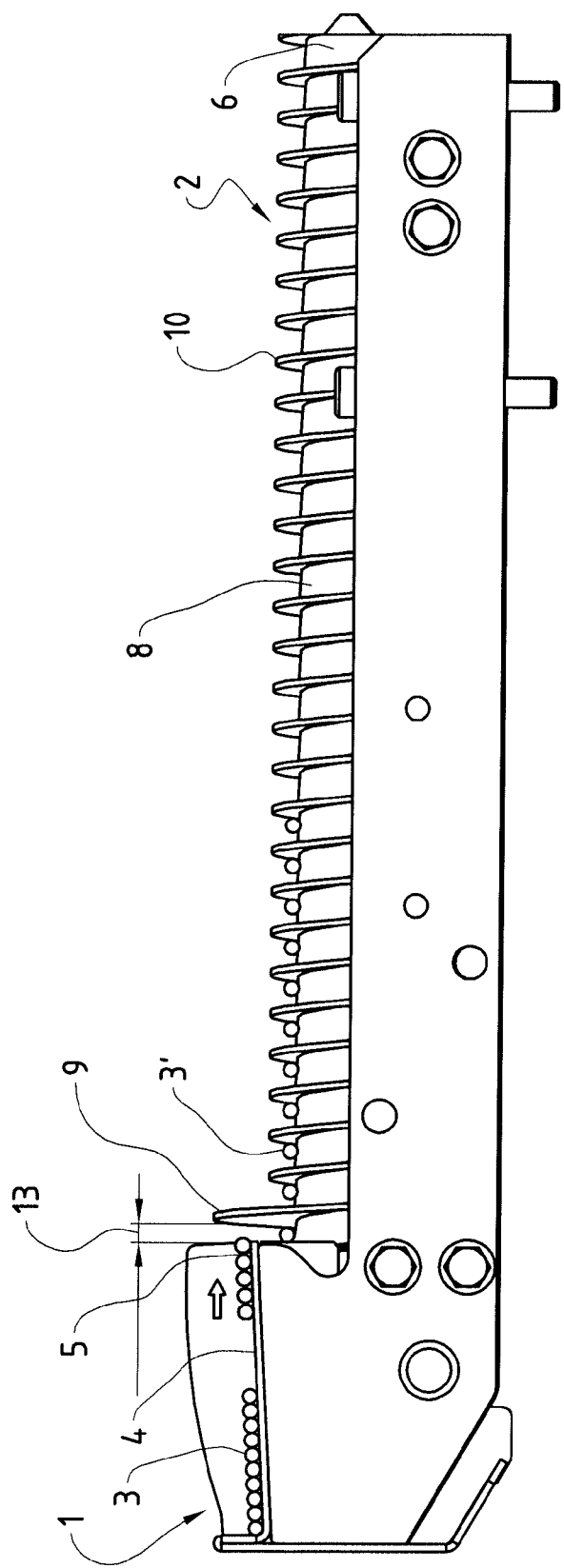

FIG. 3 show the bar feeder of FIG. 1 in a side view. The delivery chute 4 and the release edge 5 are arranged vertically above the spaces 8. In FIG. 3, the abutment screw section 9 extends radially from the rod 6 and past the release edge 5 of the delivery chute 4 in vertical direction. In this position the abutment screw section 9 functions as a stopper and/or separator for bars 3, which are delivered in direction of the transport unit 2 as will be explained later on. The other rods 6' and 6" of the transport unit 2 are arranged in the same position.

As can be seen in FIG. 3, the abutment screw section 9 is positioned such that a gap 13 results between this abutment screw section 9 and the release edge 5 of the delivery mechanism. Therefore, the bar 3 which is pushed from the chute 4 is free to fall over the release edge 5 into the space located before the abutment screw section 9 in transport direction (on the left-hand side in FIG. 3). At the same time, the abutment screw section 9 serves as the stopper for the bar 3, preventing this from falling into one of the spaces 8 which are situated behind the abutment screw section 9 (i.e. on the right-hand side in FIG. 3). Therefore, this abutment screw portion 9 makes sure that no longitudinal rods 3 being fed from the storage unit 1 to the transportation unit 2 enters a space 8 which has already been occupied by one of the previous rods 3'.

By rotating the rods 6, 6', 6" the bar 3' is moved along the length of the rods in transport direction. Thereby, the abutment screw section 9 is rotated around the bar 3' so that it comes to lie in the space 8 behind the abutment screw section 9 and is further transported along the rod 6 by further rotation of the rod 6.

Also by further rotating the rods 6, 6', 6" the separating edge 11 of the abutment screw section 9 is rotated in direction of the release edge 5 again. By doing so, the second bar can now fall into the space located on the left-hand side of the abutment screw section 9, which is free again since the first bar has already proceeded behind the abutment screw section 9 to space 8. Preferably, the gap 13 is large enough to let the bar 3 drop down just shortly before the separation edge 11 passes the release edge 5 again to ensure that there is just one bar 3 falling through the gap 13. Thus, the transport unit 2 also functions as a separating unit of the bar feeder according to the invention.

By continuously turning the rods 6, 6', 6" one bar 3 after the other is delivered onto the transport unit 2, each in a separate space 8. The bars can be transported individually along the length of the transport unit to a further processing machine. The pitch of the helical abutment screw section 9 is selected according to the diameter of the bars to be supported. Also the pitch can be selected according to a number of bars, which shall be delivered together to one space. Preferably the rod 6, the screw-like wall 10 and the abutment screw section 9 are made as one single piece.

The storage unit and the delivery unit together build the main components of the bar feeder. A further component of the bar feeder is the control and/or drive unit for driving the delivery mechanism and/or the transport unit and for synchronizing the rods 6, 6' and 6". In the shown embodiment three rods are shown but the bar feeder also works with only two rods. As already mentioned, more than three rods 6, 6', 6" can also be used, for example in the case of very long bars, to provide more supporting points for the bars.

Although the present disclosure has been described with reference to particular means, materials and embodiments, one skilled in the art can easily ascertain from the foregoing description the essential characteristics of the present disclosure, while various changes and modifications may be made to adapt the various uses and characteristics without departing from the spirit and scope of the present invention as set forth in the following claims.

REFERENCE NUMBERS

1 storage unit
2 transport unit 3, 3' bars
delivery chute
5 release edge
6, 6', 6" rods
7 support
8' space
abutment screw section
10 screw-like wall
11 separation edge
12 second edge
13 gap
14 driving shaft

The invention claimed is:

1. Bar feeder for separately feeding longitudinal bars (3, 3') from a storage unit (1) to a transportation unit (2), wherein the storage unit (1) comprises a delivery mechanism which delivers bars (3) in a delivery direction to the transport unit (2) and the transport unit (2) comprises separated spaces (8) for accommodating the bars (3'), which spaces (8) are moveable in a transport direction,
characterised in that an abutment means (9) is provided for allowing movement of the bar (3) in the delivery direction and into a space situated in front of the abutment means (9), the bar (3) being then moved in the transport direction by a rotational movement of the transport unit (2),
and further characterized in that a gap (3) resides between the abutment means (9) and a release edge (5) of the delivery mechanism, the gap extending in the transport direction a distance that corresponds to the diameter of a bar (3, 3') which is to be transferred to the transfer unit (2).

2. Bar feeder according to claim 1, characterized in that the abutment means (9) arranged on the transport unit (2).

3. Bar feeder according to claim 1, characterized in that the transport in (2) comprises at least two rotatably mounted rods (6, 6', 6"), wherein each rod (6, 6', 6") is oriented in transport direction and comprises a helical outer structure wound around the length of the rod (6, 6', 6").

4. Bar feeder according to claim 3, characterized in that the helical outer structure is realized as a screw-like wall structure (10) twisted around the circumference of the rod (6, 6', 6").

5. Bar feeder according to claim 1, characterized in that the abutment means is an abutment screw section (9), which extends radially from the transport unit (2) and past a release edge (5) of the delivery mechanism.

6. Bar feeder according to claim 5, characterized in that the abutment screw section (9) is a helical section of the screw-like wall structure (10).

7. Bar feeder according to claim 3, characterized in that the rod (6), the helical outer structure and the abutment means (9) are one integrally formed piece.

8. Bar feeder according to claim 1, characterized in that the delivery direction basically corresponds to the transport direction.

9. Bar feeder according to claim 1, characterized in that the delivery unit (1) comprises a delivery chute (4) which is terminated by a release edge (5), wherein the release edge (5) is arranged vertically above the transport unit (2).

10. Bar feeder according to claim 1, characterized in that the gap (13) is upstream of the abutment means (9) in the transport direction.

11. Bar feeder according to claim 3, characterized in that, the abutment means (9) extends in a radial direction past a release edge (5) of the delivery mechanism for more than 180° around the rod (6).

12. Bar feeder according to claim 3, characterized in that the abutment means (9) comprises a separating edge (11) radially extending from the transport unit (2), wherein the separating edge (11) cuts in between a first bar (3) and a second bar when rotated by the rod (6).

13. Bar feeder according to claim 3, characterized in that a control unit is provided, which controls the rotation of the at least two rods (6, 6', 6") such that their abutment means are in equal rotational position relative to the release edge (5).

14. Bar feeder according to claim 11, characterized in that the abutment means (9) extends in the radial direction past the release edge (5) of the delivery mechanism for about 360° around the rod (6).

15. Bar feeder for separately feeding longitudinal bars (3, 3') from a storage unit (1) to a transportation unit (2), wherein the storage unit (1) comprises a delivery mechanism including a delivery chute (4) which allows bars (3) to be delivered in a delivery direction to the transport unit (2) and the transport unit (2) comprises separated spaces (8) for accommodating the bars (3'), which spaces (8) are moveable in a transport direction,
characterized in that an abutment screw section (9) is provided for allowing movement of the bar (3) in the delivery direction and into a space situated in front of the abutment screw section (9), the bar (3) being then moved in the transport direction by a rotational movement of the transport unit (2),
and further characterized in that the abutment screw section (9) is positioned directly downstream of the delivery chute (4) in the delivery direction.

* * * * *

UNITED STATES PATENT AND TRADEMARK OFFICE
CERTIFICATE OF CORRECTION

| | |
|---|---|
| PATENT NO. | : 9,687,948 B2 |
| APPLICATION NO. | : 15/038940 |
| DATED | : June 27, 2017 |
| INVENTOR(S) | : Frank Antonin Reisser et al. |

It is certified that error appears in the above-identified patent and that said Letters Patent is hereby corrected as shown below:

In the Specification

Column 1, Lines 30-31, reads "... For separation the bars may manually or automatically entered into a sorting unit, ..." should read --... For separation the bars may manually or automatically be entered into a sorting unit, ...--.

Column 2, Line 1, reads "... the swing member, and also may not be to small so that more ..." should read --... the swing member, and also may not be too small so that more ...--.

Column 2, Lines 9-11, reads "... proper separation and feeding of bars, is suitable for different kind of bars and works reliably, in particular for the transportation of bars in a high pace." should read --... proper separation and feeding of bars, is suitable for different kinds of bars and works reliably, in particular for the transportation of bars at a high pace.--.

Column 3, Line 9, reads "By rotating the rods the spaces and the supporting points respectively, defined by ..." should read --By rotating the rods, the spaces, and supporting points respectively, defined by ...--.

Column 3, Line 31, reads "... be a helically section extending from ..." should read --... be a helical section extending from ...--.

Column 4, Line 64, reads "... less than tree rods 6', 6", 6'''." should read --... less than three rods 6', 6", 6'''.--.

Column 5, Lines 35-36, reads "... spaces 8 are not defined as fixed compartments of the rod, but as an areas of the rod, ..." should read --... spaces 8 are not defined as fixed compartments of the rod, but as areas of the rod, ...--.

Column 5, Line 52, reads "... because of the helical structure of the of the abutment screw ..." should read --... because of the helical structure of the abutment screw ...--.

Signed and Sealed this
Tenth Day of April, 2018

Andrei Iancu
*Director of the United States Patent and Trademark Office*

Column 5, Line 61, reads "FIG. 3 show the bar feeder of ..." should read --FIG. 3 shows the bar feeder of ...--.

In the Claims

Column 7, Line 27, Claim 1, reads "... and further characterized in that a gap (3) resides between ..." should read --... and further characterized in that a gap (13) resides between ...--.

Column 7, Lines 33-34, Claim 2, reads "Bar feeder according to claim 1, characterized in that the abutment means (9) arranged on the transport unit (2)." should read --Bar feeder according to claim 1, characterized in that the abutment means (9) is arranged on the transport unit (2).--.

Column 7, Line 36, Claim 3, reads "... the transport in (2) comprises at least ..." should read --... the transport unit (2) comprises at least ...--.

Column 8, Line 14, Claim 11, reads "Bar feeder according to claim 3, characterized in that, ..." should read --Bar feeder according to claim 3, characterized in that ...--.